United States Patent
Faust et al.

(10) Patent No.: US 7,010,726 B2
(45) Date of Patent: Mar. 7, 2006

(54) METHOD AND APPARATUS FOR SAVING DATA USED IN ERROR ANALYSIS

(75) Inventors: Robert Allan Faust, Austin, TX (US); Kevin Gene Kehne, Austin, TX (US); Sayileela Nulu, Austin, TX (US); Gary Lee Ruzek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 09/798,169

(22) Filed: Mar. 1, 2001

(65) Prior Publication Data

US 2002/0124209 A1    Sep. 5, 2002

(51) Int. Cl.
*G06F 11/00*    (2006.01)

(52) U.S. Cl. .......................... 714/45; 714/31
(58) Field of Classification Search ................. 714/45, 714/57, 30, 31, 48
See application file for complete search history.

(56) References Cited

U.S. PATENT DOCUMENTS

| | | | | |
|---|---|---|---|---|
| 5,265,207 A | * | 11/1993 | Zak et al. ...................... 712/15 |
| 5,335,341 A | * | 8/1994 | Chana ........................ 714/37 |
| 5,349,675 A | * | 9/1994 | Fitzgerald et al. ..... 379/102.01 |
| 5,564,040 A | * | 10/1996 | Kubala ........................ 711/173 |
| 5,619,644 A | * | 4/1997 | Crockett et al. ............... 714/45 |
| 5,748,884 A | * | 5/1998 | Royce et al. .................. 714/57 |
| 5,805,790 A | * | 9/1998 | Nota et al. ..................... 714/10 |
| 5,872,970 A | * | 2/1999 | Pickett et al. ............... 718/101 |
| 6,199,179 B1 | * | 3/2001 | Kauffman et al. ............ 714/26 |
| 6,233,680 B1 | * | 5/2001 | Bossen et al. ................ 713/1 |
| 6,256,756 B1 | * | 7/2001 | Faulk, Jr. ..................... 714/718 |
| 6,401,174 B1 | * | 6/2002 | Hagersten et al. .......... 711/147 |
| 6,412,089 B1 | * | 6/2002 | Lenny et al. ................ 714/769 |
| 6,457,138 B1 | * | 9/2002 | Lesser et al. .................. 714/1 |
| 6,493,656 B1 | * | 12/2002 | Houston et al. ............ 702/187 |
| 6,496,945 B1 | * | 12/2002 | Cepulis et al. ................ 714/25 |
| 6,516,429 B1 | * | 2/2003 | Bossen et al. ................ 714/47 |
| 6,543,010 B1 | * | 4/2003 | Gaudet et al. ................ 714/45 |
| 6,594,785 B1 | * | 7/2003 | Gilbertson et al. ........... 714/48 |
| 6,658,594 B1 | * | 12/2003 | Bui et al. ...................... 714/10 |
| 6,658,599 B1 | * | 12/2003 | Linam et al. ................. 714/25 |
| 2002/0120884 A1 | * | 8/2002 | Nakamikawa et al. ........ 714/31 |

* cited by examiner

*Primary Examiner*—Scott Baderman
*Assistant Examiner*—Gabriel L. Chu
(74) *Attorney, Agent, or Firm*—Duke W. Yee; Mark E. McBurney; Lisa L. B. Yociss

(57) ABSTRACT

A method, apparatus, and computer implemented instructions for saving data in a logically partitioned data processing system. An error is detected in the logically partitioned data processing system. Data needed for error analysis of the error is saved in a power independent memory associated with a service processor.

27 Claims, 3 Drawing Sheets

METHOD AND APPARATUS FOR SAVING DATA USED IN ERROR ANALYSIS

BACKGROUND OF THE INVENTION

1. Technical Field

The present invention relates generally to an improved data processing system and in particular to a method and apparatus for managing data. Still more particularly, the present invention provides a method and apparatus for saving data used in error analysis within a data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

The configuration of these different partitions are typically managed through a terminal, such as a hardware system console (HSC). These terminals use objects, also referred to as profiles that are defined and modified in HSC. The profiles are used to configure LPARs within the data processing system. Multiple HSCs may be present and used for maintaining and configuring LPARs in the data processing system. These profiles used to configure the data processing system in LPARs are often required to be accessible to any HSC that is in communication with the data processing system. Maintaining profiles between these HSCs are often difficult and require processes for maintaining synchronization of the profiles at each HSC.

These LPARs are often assigned processors and other hardware. For example, one LPAR may be assigned two processors, while another LPAR may be assigned three processors. If an error occurs, a service processor (SP), separate from the other five processors, will store data gathered from the processors and other hardware for analysis. This type of data is also referred to as dump data. This dump data and other information, such as error logs are typically stored in a non-volatile random access memory (NVRAM) for retrieval at a later time. This type of memory, however, has a number of limitations. As multi processor systems have grown larger, the amount of data that is stored has out grown the available NVRAM space. Additionally, this type of memory also may be easily corrupted because many software components may access this memory during normal operation. Further, the loss of battery power will cause the contents of the memory to be lost.

Therefore, it would be advantageous to have improved method, apparatus, and computer implemented instructions for saving data used for error analysis.

SUMMARY OF THE INVENTION

The present invention provides a method, apparatus, and computer implemented instructions for saving data in a logically partitioned data processing system. An error is detected in the logically partitioned data processing system. Data needed for error analysis of the error is saved in a power independent memory for a service processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
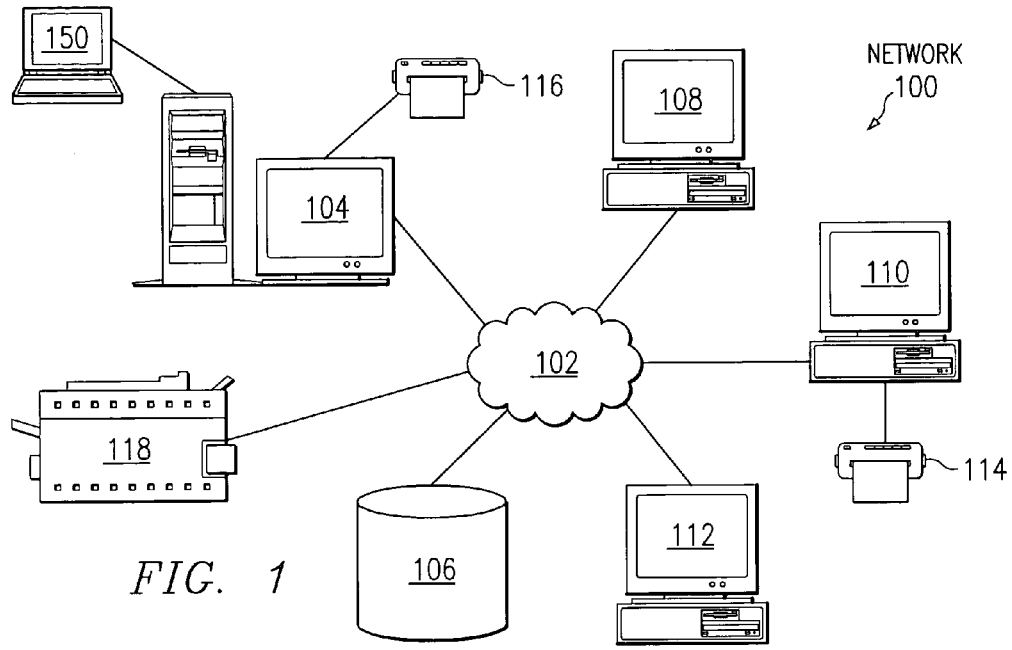
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network 102. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
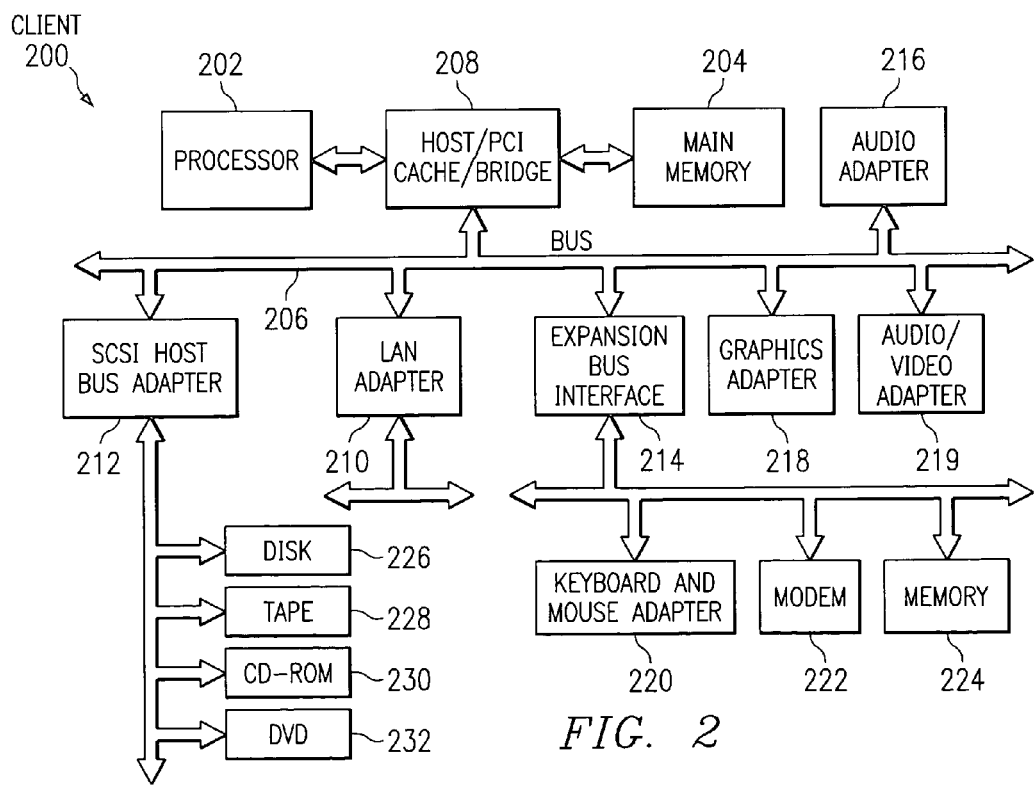
FIG. 2 is a block diagram of a data processing system in accordance with the present invention.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as AIX, which is available from International Business Machines Corporation. "AIX is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
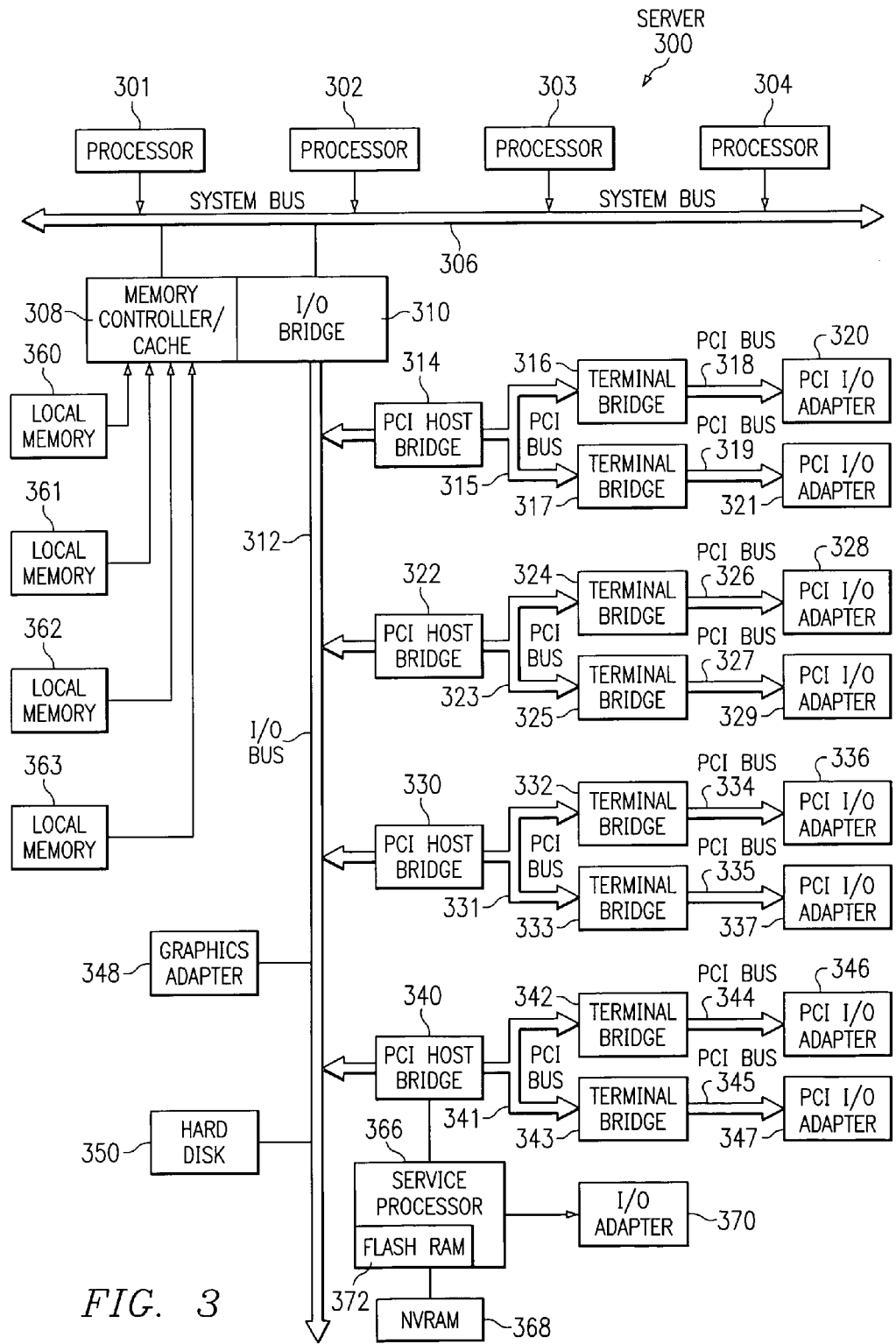
FIG. 3 is a block diagram of a data processing system, which may be implemented as a logically partitioned server.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM pSeries eServer, a product of International Business Machines Corporation in Armonk, N.Y. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a LINUX operating system may be operating within logical partition P3. LINUX is a version of UNIX and is an open source software operating system.

Peripheral component interconnect (PCI) Host bridge 314 connected to I/O bus 312 provides an interface to PCI local bus 315. A number of terminal bridges 316–317 may be connected to PCI bus 315. Typical PCI bus implementations will support four terminal bridges for providing expansion slots or add-in connectors. Each of terminal bridges 316–317 is connected to a PCI I/O Adapter 320–321 through a PCI Bus 318–319. Each I/O Adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not affected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343, which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Management of logical partitions is achieved through terminals, such as hardware system consoles (HSC). This access is provided in these examples through service processor 366, nonvolatile random access memory (NVRAM) 368, and input/output (I/O) adapter 370, which may be implemented as a Universal Asynchronous Receiver Transmitter (UART). Service processor 366 also includes a storage device, which is not dependent on a power source, such as a battery to maintain the contents of the storage device. In this example, the storage device is a flash ram 372, which is a programmable and reusable chip that holds its content until erased and reprogrammed (reflashed). Flash rams have a life span of about 100,000 write cycles.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The present invention provides an improved method, apparatus, and computer implemented instructions for saving data, such as system dump data and error logs. In these examples, dump data includes system registers, stack contents, and origin of fault including partition and code instruction. This dump data may result from a firmware detected fault, as opposed to a fault detected by the operating system or a service processor. Knowing this fact may be valuable because many computer manufacturers desire to dump errors detected by the basic input/output system (BIOS), as BIOS functions increase in complexity.

The mechanism of the present invention saves the data to a flash area. The data is stored in a portion of the memory unused in firmware in these examples. In this manner, the present invention takes advantage of extra, unused space as well as the reliability of this type of memory in preventing the loss of critical data. The mechanism of the present invention using any type of flash memory. A flash memory is a memory device that can be rewritten and hold its content without power. Flash memory is widely used for digital film and for data and programs for communications and industrial products as well as a variety of handheld devices. Flash chips generally have life spans from 100K to 300K write cycles.

Figure 4:
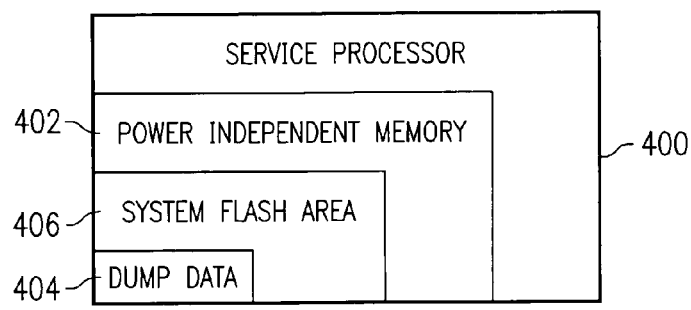
FIG. 4 is a diagram illustrating a service processor and a storage device in accordance with a preferred embodiment of the present invention.

Turning next to FIG. 4, a diagram illustrating a service processor and a storage device is depicted in accordance with a preferred embodiment of the present invention. In this example, service processor 400 includes a power independent memory 402. As depicted, power independent memory 402 takes the form of a flash memory. Of course, other types of power independent memories may be used, such as an EEPROM. Dump data 404 is stored within a system flash area within power independent 402. In this example, the portion of system flash area 406 is that unused by other firmware. These types of memories are often large compared to those of NVRAM. For example, a flash RAM may range in size to as much as 128 megabytes. In contrast, NVRAMs are typically in the neighborhood of 512 Kbytes in size.

Figure 5:
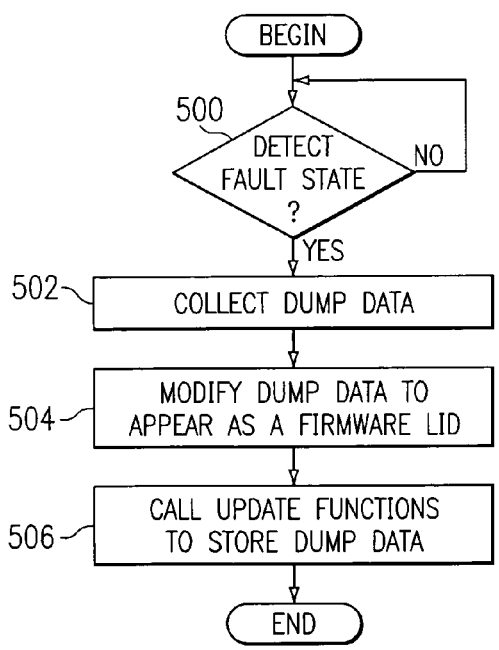
FIG. 5 is a flowchart of a process used for saving data in accordance with a preferred embodiment of the present invention.

Turning next to FIG. 5, a flowchart of a process used for saving data is depicted in accordance with a preferred embodiment of the present invention. The process illustrated in FIG. 5 may be implemented in the form of computer instructions executed by the host processor running firmware instructions. In this case, these instructions are called the Hypervisor, which is a partition manager.

The process begins by determining whether a fault state is detected (step 500). If a fault state is detected, dump data is collected (step 502). Next, the dump data is modified to appear as a firmware lid (step 504). This modification adds a header to the data so that the data appears to be a flashable module. Then, update functions are called to store the dump data (step 506) with the process terminating thereafter. In the depicted example, the data is flashed into the flash memory by the same software that manages firmware upgrades.

With reference again to step 500, if a fault state is not detected, the process begins again.

Figure 6:
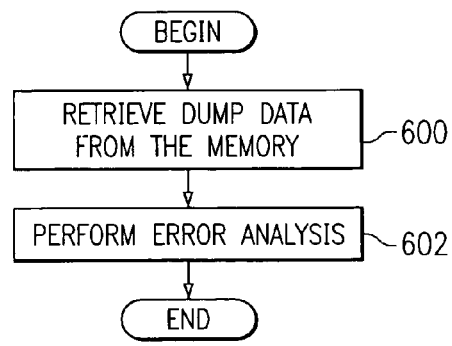
FIG. 6 is a flowchart of a process used for analyzing stored data in accordance with a preferred embodiment of the present invention.

Turning next to FIG. 6, a flowchart of a process used for analyzing stored data is depicted in accordance with a preferred embodiment of the present invention. The process illustrated in FIG. 6 may be implemented in the form of computer instructions residing in firmware and executed by the host processor.

The process begins by retrieving dump data from the power independent memory (step 600). The host processor, executing firmware instructions, makes a request of the flash memory manager for a pointer to the dump data, then the dump data is simply read from that location. The flash memory manager may be implemented using currently available instructions used to access flash memories. Next, an error analysis is performed (step 602) with the process terminating thereafter. This error analysis may be performed using any presently available analysis programs.

Thus, the present invention provides an improved method, apparatus, and computer implemented instructions for saving data used in error analysis. The mechanism of the present invention stores the data in a power independent memory associated with the service processor. In these examples, the memory is a flash RAM. In this fashion, extra, unused space is employed as well as increased reliability in preventing the loss of critical data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for saving data in a logically partitioned data processing system, said system including a plurality of processors that are assigned to one of a plurality of logical partitions, the method comprising:
   detecting an error in the logically partitioned data processing system; and
   saving data needed for error analysis of the error in a power independent memory that is included within a service processor, said service processor being utilized to manage said plurality of logical partitions.

2. The method of claim 1, wherein said memory is a type of electrically erasable programmable read only memory.

3. The method of claim 1, wherein the data includes at least one of stack registers, general purpose registers, and floating point registers.

4. The method of claim 1 further comprising:
   retrieving the data from the memory for analysis.

5. The method of claim 1, wherein the data is saved between system boots of the data processing system.

6. The method of claim 1, wherein the memory has a size of 16 megabytes.

7. The method of claim 1, wherein the data includes an error log.

8. The method of claim 1, wherein the data includes dump data.

9. A logically partitioned data processing system comprising:
   a bus system;
   a communications unit connected to the bus system, wherein data is sent and received using the communications unit;
   a firmware connected to the bus system, wherein a set of instructions are located in the firmware;
   a plurality of processors that are assigned to one of a plurality of logical partitions:
   a service processor connected to the bus system, said service processor being utilized to manage said plurality of logical partition;
   a power independent memory included within the service processor; and
   a host processor connected to the bus system, wherein the host processor executes the set of instructions in firmware to detect an error in the logically partitioned data processing system; and save data needed for error analysis of the error in the power independent memory included within the service processor.

10. The data processing system of claim 9, wherein the bus system includes a primary bus and a secondary bus.

11. The data processing system claim 9, wherein the communications unit is an Ethernet adapter.

12. A data processing system for saving data in a logically partitioned data processing system, said system including a plurality of processors that are assigned to one of a plurality of logical partitions, the data processing system comprising:
   detecting means for detecting an error in the logically partitioned data processing system; and
   saving means for saving data needed for error analysis of the error in a power independent memory included within a service processor, said service processor being utilized to manage said plurality of logical partitions.

13. The data processing system of claim 12, wherein the power independent memory is an erasable programmable read only memory.

14. The data processing system of claim 12, wherein the data includes at least one of stack registers, general purpose registers, and floating point registers.

15. The data processing system of claim 12, further comprising:
   retrieving means for retrieving the data from the power independent memory for analysis.

16. The data processing system of claim 12, wherein the data is saved between system boots of the data processing system.

17. The data processing system method of claim 12, wherein the power independent memory has a size of 16 megabytes.

18. The data processing system of claim 12, wherein the data includes an error log.

19. The data processing system of claim 12, wherein the data includes dump data.

20. A computer program product in a computer readable medium for saving data in a logically partitioned data processing system, said system including a plurality of processors that are assigned to one of a plurality of logical partitions, the computer program product comprising:
   first instructions for detecting an error in the logically partitioned data processing system; and
   second instructions for saving data needed for error analysis of the error in a power independent memory included within a service processor, said service processor being utilized to managed said plurality of logical partitions.

21. The computer program product of claim 20, wherein the power independent memory is an erasable programmable read only memory.

22. The computer program product of claim 20, wherein the data includes at least one of stack registers, general purpose registers, and floating point registers.

23. The computer program product of claim 20 further comprising:
 third instructions for retrieving the data from the power independent memory for analysis.

24. The computer program product of claim 20, wherein the data is saved between system boots of the data processing system.

25. The computer program product of claim 20, wherein the power independent memory has a size of 16 megabytes.

26. The computer program product of claim 20, wherein the data includes an error log.

27. The computer program product of claim 20, wherein the data includes dump data.

* * * * *